United States Patent

Semenov et al.

[11] Patent Number: 6,107,596
[45] Date of Patent: Aug. 22, 2000

[54] METHOD FOR PRODUCING A WELDED-BRAZED COMBUSTION CHAMBER

[75] Inventors: Viktor Nikonorovich Semenov, Moskovskaya oblast; Anatoly Ivanovich Grigoriev; Gennady Grigorievich Derkach, both of Moscow; Boris Ivanovich Katorgin, Moskovskaya oblast; Vladimir Konstantinovich Chvanov, Moskovskaya oblast; Jury Vasilievich Movchan, Moskovskaya oblast; Galina Vasilievna Shashelova, Moskovskaya oblast; Vladimir Veniaminovich Sagalovich; Evgeny Ivanovich Baranov, both of Moscow; Leonid Alexeevich Tumanov, Moskovskaya oblast; Nikolai Kondratievich Dudkin, Moskovskaya oblast; Ljudmila Alexandrovna Anosova, Moskovskaya oblast; Raisa Vasilievna Chernikova, Moskovskaya oblast; Alexandr Nikolaevich Vycherov, Moskovskaya oblast; Oleg Ivanovich Studenikin, Moskovskaya oblast; Nikolai Fedorovich Molev, Moskovskaya oblast; Jury Alexandrovich Pestov, Moskovskaya oblast; Jury Alexandrovich Bedov, Moskovskaya oblast; Alexandr Alexandrovich Vasin, Moscow; Vladimir Jurievich Bogushev, Moskovskaya oblast; Vladimir Vladimirovich Fedorov, Moscow; Nikolai Mikhailovich Grigorkin, Moskovskaya oblast; Galina Andreevna Babaeva, Moscow; Stanislav Dmitrievich Kamensky, Moskovskaya oblast, all of Russian Federation

[73] Assignee: Otkrytoe Aktsionernoe Obschestvo "Nauchno-Proizvodstvennoe Obiedinenie "Energomash"Imeni Akademika V.P. Glushko", Moskovskaya oblast, Russian Federation

[21] Appl. No.: 09/391,860
[22] Filed: Sep. 8, 1999
[30] Foreign Application Priority Data Feb. 4, 1999 [RU] Russian Federation ............. 99102061

[51] Int. Cl.$^7$ ...................................................... B23K 15/04
[52] U.S. Cl. .................................... 219/121.14; 29/890.01
[58] Field of Search .............................. 219/59.1, 121.14, 219/137 R; 29/890.01; 228/181, 184

[56] References Cited

U.S. PATENT DOCUMENTS

| 3,224,678 | 12/1965 | Rosman | 29/890.01 |
| 3,418,707 | 12/1968 | Emerson | 29/890.01 |
| 5,786,559 | 7/1998 | Ottino et al. | 219/121.64 |

FOREIGN PATENT DOCUMENTS

| 54-62411 | 5/1979 | Japan . |
| 62-250104 | 10/1987 | Japan . |
| 62-276247 | 12/1987 | Japan . |

OTHER PUBLICATIONS

G.G. Gakhun et al, "Liquid–Propellant Rocket Engine Design and Engineering", Moscow, 1989, p. 114, Fig. 6,23.

I.I. Gorev, "Outlines of Liquid–Propellant Rocket Engine Production", Mashinostroyeniye, Moscow, 1969, pp. 10–13, 50–58, 61–62, 68–69, 81, 91.

*Primary Examiner*—Gregory Mills
*Attorney, Agent, or Firm*—Christie, Parker & Hale, LLP

[57] ABSTRACT

A combustion chamber for a liquid-propellant rocket engine includes an injector head jointed to a combustion chamber casing having an exhaust head on a nozzle output. The casing is made of a steel jacket and a bronze-steel internal fire wall, which are joined with each other and contain shells connected in series. The exhaust head with shells of the casing, jointed to the exhaust head, are brazed using a solder on the basis of nickel, chromium and manganese. Parts of the injector head and other members of the combustion chamber casing are brazed using a copper-silver solder. Shells of the fire wall are connected by an electron-beam welding, directing an electron beam into axial gaps left while brazing between shells of the jacket. The shells of the jacket are then sequentially connected by an automatic gas-shielded arc welding through corresponding ring spacers.

3 Claims, 2 Drawing Sheets

METHOD FOR PRODUCING A WELDED-BRAZED COMBUSTION CHAMBER

FIELD OF THE INVENTION

The invention relates to the field of welding and more particularly, to methods for producing a welded-brazed construction, and can find application in fabrication of a casing for a combustion chamber of a liquid-propellant rocket engine.

BACKGROUND OF THE INVENTION

A method of welding sections of a combustion chamber for a liquid-propellant rocket engine, wherein the sections of the combustion chamber are jointed by welding through spacers, is known in the prior art (G. G.Gakhun, V. I.Baulin, V. A. Volodin et al. "Liquid-Propellant Rocket Engine Design and Engineering", Moscow, 1989, p. 114, FIG. 6,23). The above reference, however, fails to indicate types of welds and brazed joints.

Most closely approaching the present invention is a method of producing a welded-brazed casing of a combustion chamber for a liquid-propellant rocket engine, the combustion chamber comprising an injector head jointed to the chamber casing made of separate units and having an exhaust head on a nozzle output, the units of the chamber casing being made of mating parts, one of which has a cylinder shape and the other parts have profiles in the form of arcs of ring-shaped ovals and consist of an external power jacket made of steel and an internal fire wall made of bronze and steel, connected with each other, the method including the steps of brazing external and internal shells of separate combustion chamber units with each other, and connecting separate units of the combustion chamber in a given sequence by welding shells of the power jacket and shells of the fire wall, respectively, with each other,. (I. I.Gorev "Outlines of Liquid-Propellant Rocket Engine Production", Mashinostroyeniye, Moscow, 1969, pp. 10–13, 50–58, 61–62, 68–69, 81, 91). Disadvantages of the method include poor quality of brazing, resulting in frequent failure of air-tightness when operating under stressed conditions and vibrations of parts, and technological ineffectiveness of the welding process, this leading to misalignment of units in the structure and appearance of such defects as cracks.

SUMMARY OF THE INVENTION

It is an object of the present invention to provide an improvement in the production process for providing high-quality brazed and welded joints, including the alignment of parts in a welded-brazed construction and reliable operation of the joints, especially in constructions designed for wide ranges of pressure, temperature, active oxidizing media and vibration overloads, inherent in high-power liquid-propellant rocket engines.

The present invention provides a reliable and simple process for producing large-size combustion chambers for liquid-propellant rocket engines, with regenerative cooling in the combustion chambers using chemically active propellant components and products of their reaction.

The object of the invention in achieved in a method for producing a welded-brazed casing for a combustion chamber of a liquid-propellant rocket engine, the combustion chamber comprising an injector head jointed to the chamber casing made of separate units and having an exhaust head on a nozzle output, the units of the chamber casing being made of mating members, one of which has a cylinder shape and the other members have profiles in the form of arcs of ring-shaped ovals and consist of an external power jacket made of steel, and an internal fire wall made of bronze and steel and having passages for regenerative cooling, the external power jacket and the internal fire wall being jointed together, the method including the steps of brazing external and internal shells of separate combustion chamber units with each other, and connecting separate combustion chamber units with each other in a given sequence by welding shells of the power jacket and shells of the fire wall, respectively, with each other, brazing the exhaust head and the shells of the casing with each other being made by a solder on the basis of nickel, chromium, and manganese, and brazing parts of the injector head and other elements of the combustion chamber casing being made by a copper-silver solder, jointing the shells of the fire wall being made by electron-beam welding, with an electron beam being directed into axial gaps left while brazing between the shells of the power jacket, followed by sequentially connecting the shells of the power jacket through respective ring spacers mounted in the axial gaps. The spacers mounted in the places of welds of the shells of the fire wall are made dismountable in the form of circular arcs jointed at the point of connection by an electron-beam gas-shielded welding, while the jointing of the injector head with the combustion chamber casing is made by three welds, a first of which is made on an internal part of a grooved joint of the fire wall by an automatic arc gas-shielded welding using a consumable electrode and a filling wire, a second weld is made on a external side of a grooved joint of the power jacket and the spacer, an automatic argon-arc welding by a non-consumable electrode being performed first to provide a weld root, followed by an automatic helium-arc welding by a consumable electrode to fill the remaining joint, grooving for this weld being made without a gap in the weld root, and a third weld is also made on the external side of the joint between the power jacket and the spacer by an automatic helium-arc welding using a consumable electrode, grooving for this weld being made with a gap in the weld root to provide free shrinkage when making the second weld.

DESCRIPTION OF PREFERRED EMBODIMENTS

Figure 1:
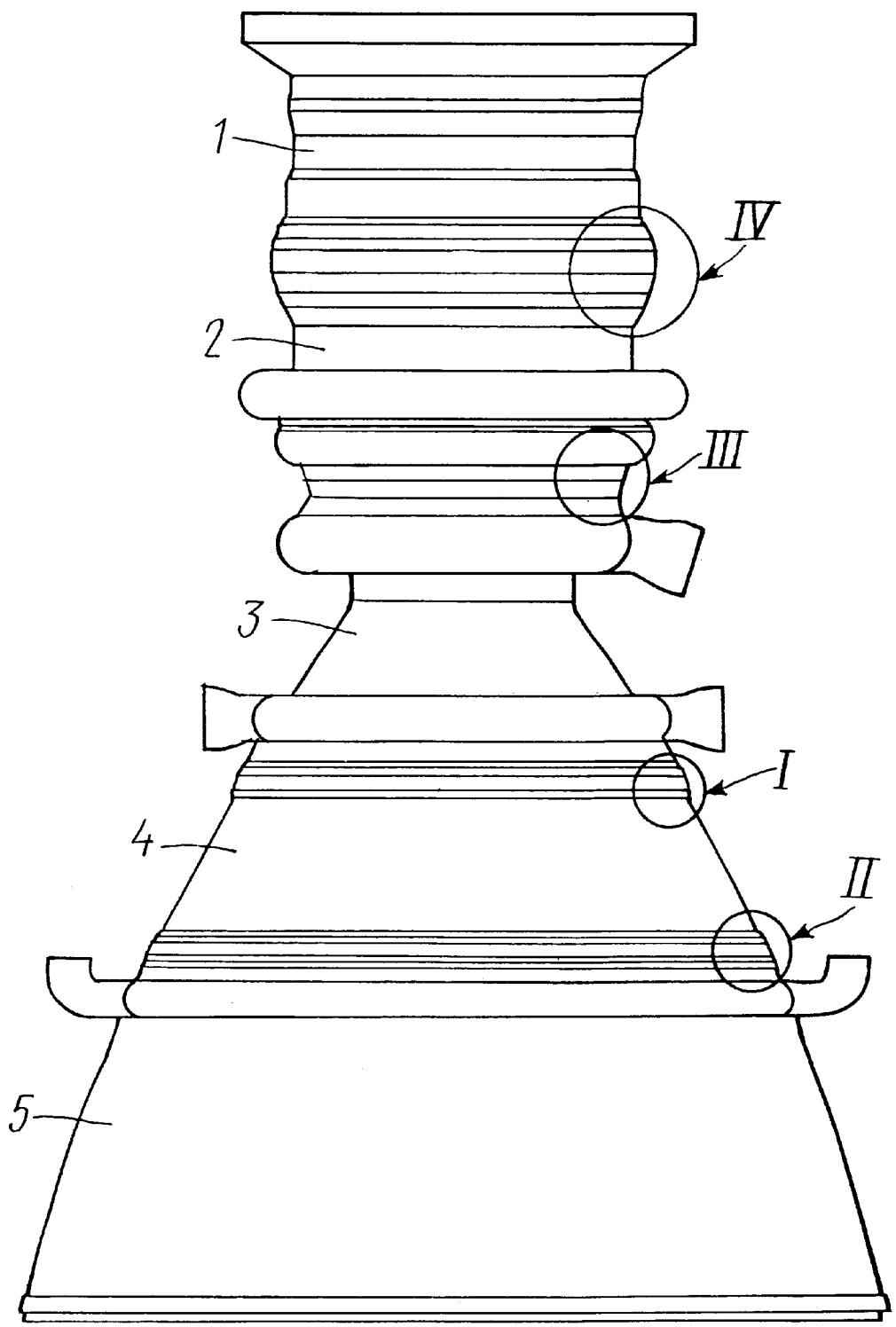
FIG. 1 shows a combustion chamber of a liquid-propellant rocket engine in accordance with the invention.

A method for producing a welded-brazed combustion chamber is accomplished in the following manner. First, parts and units of the combustion chamber are fabricated, including an injector head 1, a cylinder part 2 of a chamber casing, a nozzle inlet 3 with a throat, a nozzle intermediate part 4 and an exhaust head 5.

Figure 2:
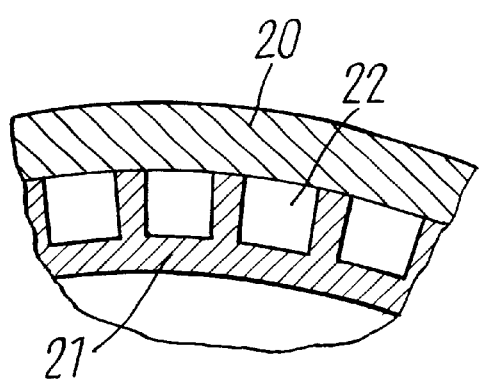
FIG. 2 is a fragmentary view of a brazed joint of a steel power jacket (outer piece) and an inner fire wall of the casing (inner piece), in accordance with the invention.

The injector head 1 is assembled by applying a solder onto surfaces to be brazed. The units 2, 3, 4, 5 are assembled by applying a brazed solder onto contact surfaces of a power jacket and an inner fire wall to be jointed by brazing. FIG. 2 shows a structure of brazed joints for the units 1, 2, 3, 4, 5, where an outer piece 20 is a shell of the power jacket part and an inner piece 21 is a shell of the fire wall part of a corresponding section, provided with regenerative cooling channels 22.

Then, the units 1, 2, 3, 4, 5 are assembled by brazing the corresponding parts of the power jacket (outer part) and the fire wall (inner part) with each other.

The injector head 1, the cylinder part 2 of the casing and the nozzle inlet 3 are brazed using copper-silver solders. The intermediate nozzle part 4 and the exhaust head 5 are brazed using the solders based on nickel, chromium and manganese.

Next, a thermal treatment is accomplished to provide mechanical properties of steel in the brazed joints.

The fabricated units 1, 2, 3, 4, 5 are then welded with each other.

Figure 3:
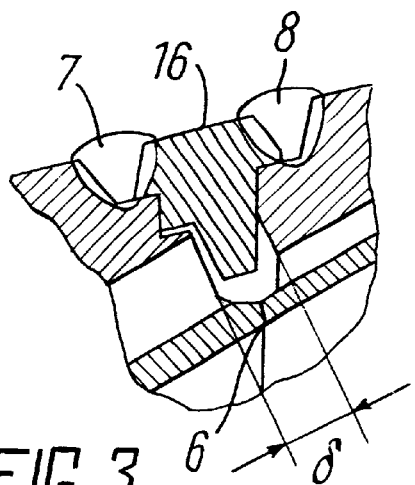
FIG. 3 is a sectional view of region I of FIG. 1, in accordance with the invention.

First, the nozzle part units 3 and 4 are welded together. Edge grooving is shown in FIG. 3. A weld 6 is made by an electron-beam welding. Referring to FIG. 3, a welding electron beam is directed through gap δ between shells of the power jacket to the place of the weld 6.

The materials welded are: chromium-alloyed bronze (the fire wall of the unit 3)+steel (fire wall of the unit 4), at a welded thickness of 1.6 mm. A spacer 16 is used for connecting the power jackets of the units 3 and 4. The spacer is mounted after making the weld 6. After that, welds 7 and 8 are welded by an automatic gas-shielded welding using a consumable electrode. The welded materials are: steel (the power jacket of the unit 3)+steel (the power jacket of the unit 4), a thickness is 4.5 mm, with a filling wire of 1.2 mm in diameter. A material of the spacer 16 is the same as that of the power jacket. The welds 6, 7, 8 are X-ray tested, the welds 7 and 8 are also subjected to dye penetrant inspection.

Figure 4:
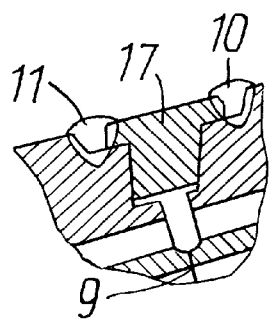
FIG. 4 is a sectional view of region II of FIG. 1, in accordance with the invention.

The fabricated nozzle part is then welded with a nozzle head 5. Edge grooving is shown in FIG. 4. A weld 9 is made first. In this case, a welding electron beam is also directed into a gap between corresponding shells of the power jacket, as in the case of the weld 6. Electron-beam welding is used. The materials welded are: steel (the fire wall of the unit 4)+steel (the fire wall of the unit 5), at a welded thickness of 1.5 mm. A spacer 17 is used for connecting power jackets of the parts 4 and 5. The spacer is mounted after completing the weld 9. Then, welds 10 and 11 are made by an automatic gas-shielded arc welding. Materials welded: steel (the power jacket of the unit 4)+steel (the power jacket of the unit 5), a thickness is 2.0 mm, a filling wire is 1.2 mm in diameter. A material of the spacer 17 is the same as that of the power jacket. Tests: X-ray testing for all welds and dye penetrant inspection.

Figure 5:
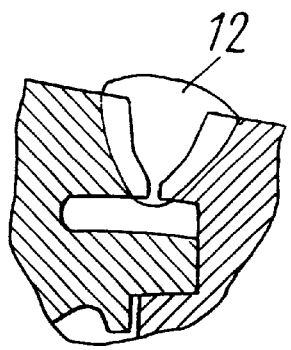
FIG. 5 is a sectional view of region III of FIG. 1, in accordance with the invention.

The nozzle part is then welded with the cylinder part 2. Grooving for the weld 12 is shown in FIG. 5. The use is made of an automatic gas-shielded welding. The welded materials are: steel (the power jacket of the unit 2)+steel (the power jacket of the unit 3), a thickness is 8.0 mm. A filling wire is used.

The weld is subjected to dye penetrant inspection and X-ray testing.

Figure 6:
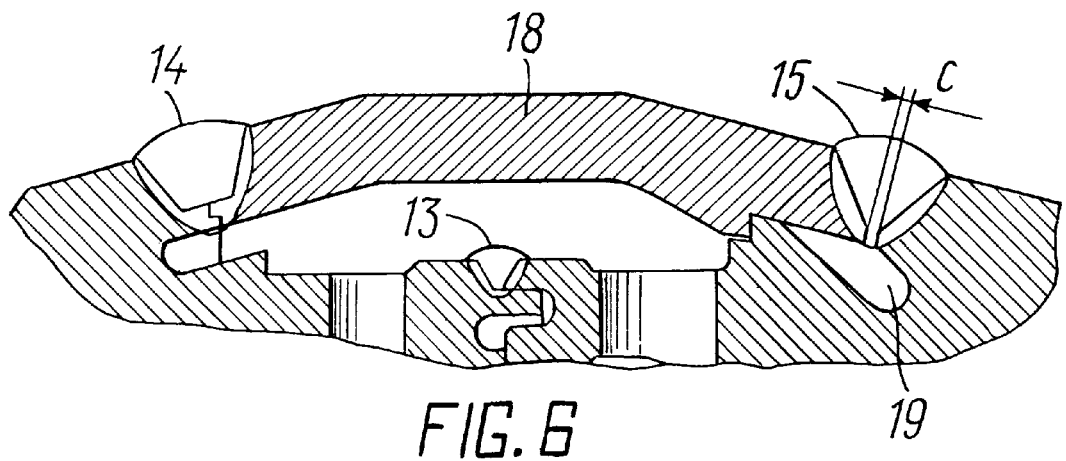
FIG. 6 is a sectional view of region IV of FIG. 1 in accordance with the invention.

And finally, the injector head 1 is welded to the cylinder part 2 of the casing. Grooving and welds are presented in FIG. 6. Three welds, 13, 14 and 15, are completed in this case.

The weld 13 is made by an automatic gas-shielded welding using a filling wire, the welded materials are steel, a thickness is 3 mm. The weld 13 is dye penetrant inspected and X-ray tested. A spacer 18, mounted after completing the weld 13, is used to connect the power jackets of the units 1 and 2 with each other.

The weld 14 provides a welded joint for the parts of the following materials: alloy (the spacer 18) and steel (the power jacket). The welded parts are of 8.5 mm in thickness. The weld is made by an automatic gas-shielded argon-arc welding. The weld is dye penetrant inspected and X-ray tested.

The weld 15 is completed by an automatic helium-arc welding using a consumable electrode. The welded materials are: steel (the power jacket)+alloy (the spacer 18), a thickness is 8.5 mm. A filling wire is used. The weld is then dye penetrant inspected and X-ray tested.

The choice of different combinations of welding methods is explained by the following. The internal welds (6 and 9) are made by an electron-beam welding because of a large depth (15 mm) and small width (3.0 mm) of the manifold.

The spacers 16, 17 and 18 are made to be split and consist of two or three parts, i.e. to have breaks along the circle that are further arc-welded. To prevent oxidation of inner spaces and disintegrity of brazed joints, while welding the joints 7, 8, 10 and 11, copper collet bars are used and argon is fed into the space between the external power jacket and the internal fire wall,.

To prevent cracking when making the welds 14 and 15, the provision is made for:
(1) free variation of gap "C" in the weld 15 while making the weld 14;
(2) presence of an internal ring-like groove 19 in the weld 15 (balancing groove).

Subsequent quality test of the welded joints showed that the above welds were free of cracks and other defects. Further, the alignment of all structure parts is afforded.

INDUSTRIAL APPLICABILITY

The method for producing a welded-brazed construction in accordance with the invention can find the most successful application in fabrication of a combustion chamber for a liquid-propellant rocket engine.

We claim:

1. A method for producing a welded-brazed casing of a combustion chamber for a liquid-propellant rocket engine, said combustion chamber comprising an injector head jointed with the chamber casing made of separate units and having an exhaust head on a nozzle outlet, the units of the chamber casing being made of mating members, one of which has a cylinder shape and the other members have profiles made by arcs of ring-shaped ovals and consist of an outer power jacket made of steel and an inner fire wall made of bronze and steel, said outer power jacket and said fire wall being jointed together, and said fire wall having regenerative cooling passages, said method including the steps of:

brazing external and internal shells of said separate units of the chamber casing with each other, connecting said separate units with each other in a given sequence by welding shells of the power jacket and shells of the fire wall, respectively, said brazing of the exhaust head and shells of the casing, connected to the exhaust head, being made using a solder on the basis of nickel, chromium, and manganese, said brazing of parts of the said injector head and other members of the chamber casing being made using a copper-silver solder, jointing the shells of the fire wall with each other by an electron-beam welding, with an electron beam being directed into axial gaps left while brazing between the shells of the power jacket, followed by jointing the shells of the power jacket with each other in series through corresponding ring spacers mounted in the axial gaps.

2. A method as set forth in claim 1, wherein said spacers mounted in places of welds of the shells of said fire wall are made dismountable in the form of circular segments jointed at points of connection by an electron-beam gas-shielded welding.

3. A method as set forth in claim 1, wherein said jointing of the injector head with the chamber casing is made by a first, second and third weld, the first weld being made on an internal part of a joint of said fire wall by an automatic arc gas-shielded welding using a consumable electrode and a filling wire, the second weld being made on an external side of a joint between said power jacket and said spacer, performing first an automatic argon-arc welding by a non-consumable electrode to obtain a weld root, followed by an automatic helium-arc welding by a consumable electrode to fill the remaining joint, grooving for said weld being made without a gap in the weld root, the third weld being also made on the external side of the joint between the power jacket and the spacer, said automatic helium-arc welding being made using a consumable electrode, grooving for this weld being made with a gap in the weld root to provide free shrinkage when making the second weld.

* * * * *

UNITED STATES PATENT AND TRADEMARK OFFICE
CERTIFICATE OF CORRECTION

PATENT NO. : 6,107,596
DATED : August 22, 2000
INVENTOR(S) : Viktor Nikonorovich Semenov et al.

It is certified that error appears in the above-identified patent and that said Letters Patent is hereby corrected as shown below:

Title page,
Item [54], the title should read -- METHOD FOR PRODUCING A WELDED-BRAZED CONSTRUCTION --

Signed and Sealed this

Seventh Day of May, 2002

Attest:

JAMES E. ROGAN
*Attesting Officer*     *Director of the United States Patent and Trademark Office*